United States Patent [19]

Franz et al.

[11] 4,430,525

[45] Feb. 7, 1984

[54] CIRCUIT ARRANGEMENT FOR CONNECTING TELEX SUBSCRIBER STATIONS TO TELETEX SUBSCRIBER STATIONS WHICH ARE CONNECTED TO THE SAME DATA EXCHANGE SYSTEM

[75] Inventors: Dietmar Franz, Puchheim; Norbert Torggler, Munich, both of Fed. Rep. of Germany

[73] Assignee: Siemens Aktiengesellschaft, Berlin & Munich, Fed. Rep. of Germany

[21] Appl. No.: 338,005

[22] Filed: Jan. 8, 1982

[30] Foreign Application Priority Data

Mar. 19, 1981 [DE] Fed. Rep. of Germany ....... 3110791

[51] Int. Cl.³ .............................................. H04L 13/08
[52] U.S. Cl. .......................................... 178/3; 178/2 B
[58] Field of Search ............... 178/3, 2 B; 179/18 BS, 179/18 E, 18 C; 364/900

[56] References Cited

U.S. PATENT DOCUMENTS 4,074,232  2/1978  Otomo et al. ....................... 178/3 X

FOREIGN PATENT DOCUMENTS 2912649  10/1980  Fed. Rep. of Germany .

OTHER PUBLICATIONS

Gosslau K. et al "A New Electronic Data Switching System for Data Communication", NTZ, vol. 8, 1969, pp. 444–463.

Primary Examiner—Stafford D. Schreyer
Attorney, Agent, or Firm—Hill, Van Santen, Steadman & Simpson

[57] ABSTRACT

A data exchange system is connected to at least one signal converter in which digital signals emitted from teletex subscriber stations are converted so that they may be processed by teletex subscriber stations, and vice-versa. In order that the load on the signal converters may be as low as possible in the event that digital signals cannot be deposited in the desired subscriber station, the data exchange system is additionally connected to at least two special teletex transmitting-/receiving devices. These teletex transmitting/receiving devices can be operated by a special call signal only in the event that a teletex subscriber station or a signal converter is currently unable to deposit digital signals in the desired subscriber station. In response to such operation of the teletex transmitting/receiving devices, the latter is supplied with digital signals which cannot currently be deposited, together with additional information which enable the establishment of a connection to the desired subscriber station. Subsequently, the teletex transmitting/receiving device is able to transmit the digital signals which it has received, on the basis of the additional information, to the desired subscriber station.

2 Claims, 1 Drawing Figure

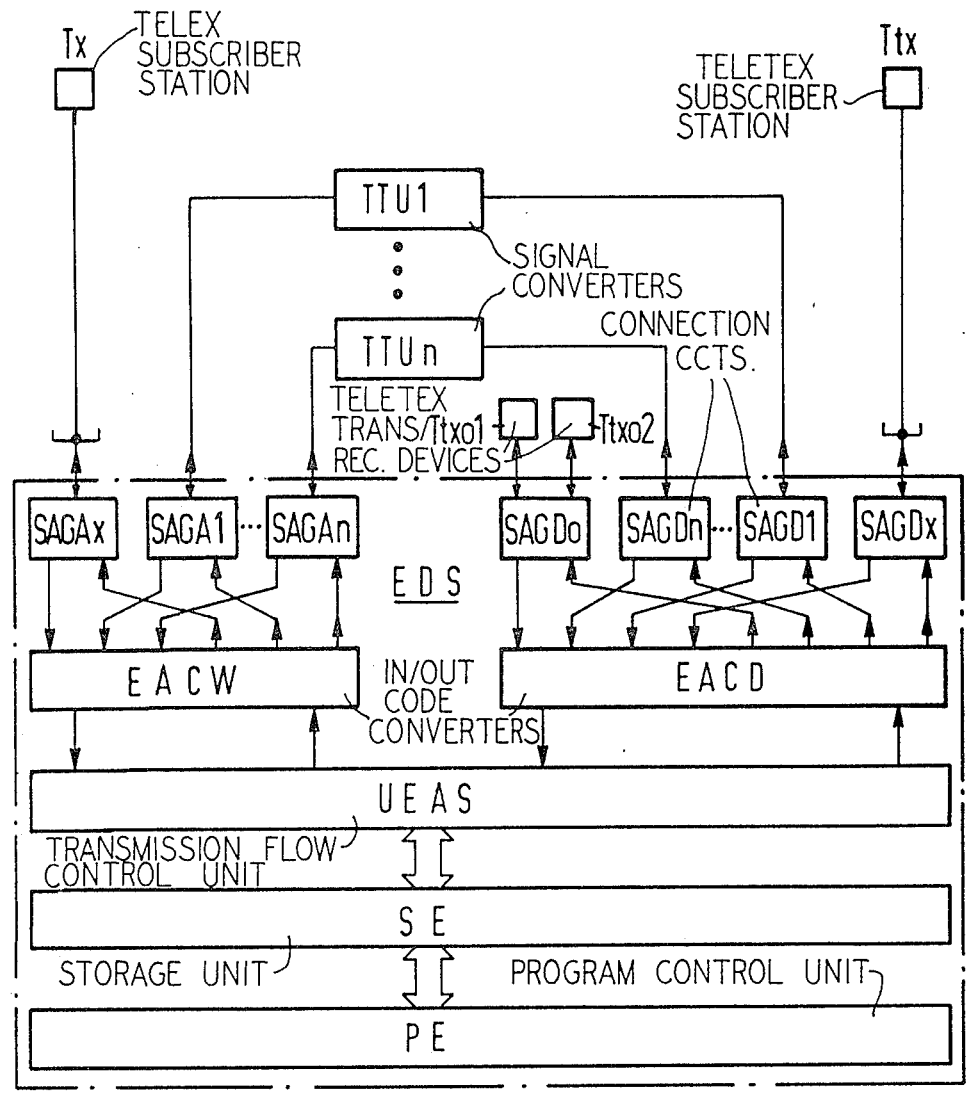

CIRCUIT ARRANGEMENT FOR CONNECTING TELEX SUBSCRIBER STATIONS TO TELETEX SUBSCRIBER STATIONS WHICH ARE CONNECTED TO THE SAME DATA EXCHANGE SYSTEM

BACKGROUND OF THE INVENTION

1. Field of the Invention

The present invention relates to a circuit arrangement for connecting telex subscribers, which are connected to a data exchange system, to teletex subscribers which are likewise connected to the data exchange system. More particularly, the invention relates to a circuit arrangement which employs at least one signal converter which is connected to the data exchange system and in which the digital signals transmitted from the telex subscriber stations are converted so as to enable the same to be processed by the teletex subscriber stations, and in which the digital signals transmitted from the teletex subscriber stations are converted so as to enable the same to be processed by the telex subscriber stations.

2. Description of the Prior Art

A circuit arrangement of the type generally set forth above is already known in the art from the German Offenlegungsschrift No. 29 12 649. In this known circuit arrangement, the digital signals emitted from the relevant subscriber station are, first of all, fully received and intermediately stored in the signal converter, whereupon, during the course of the transmission of these signals, the actual signal conversion takes place. If a subscriber station which is to receive the digital signals is not currently attainable, so that the relevant digital signals cannot be deposited, the digital signals remain intermediately stored in the signal converter. However, this means that the signal converter is then blocked from being included in further connections between telex subscriber stations and teletex subscriber stations.

In order to avoid the above-described difficulty with respect to blockage, it would be possible to proceed in such a manner as to limit the maximum seizure time of the signal converter. However, this sort of procedure is not possible when it is important that the digital signals intermediately stored in the signal converter should not be lost.

It would also be conceivable that, in the event that the digital signals cannot be deposited, the digital signals intermediately stored in the signal converter may be returned to the subscriber station from which they were previously transmitted. However, this measure will not be used in view of the fact that this subscriber station merely requires confirmation of the inaccessibility of the subscriber station applied as a receiving subscriber station. In addition, it can occur that the subscriber station which previously transmitted the aforementioned digital signals is likewise no longer accessible, for example due to the absence of its subscriber number (in the case of telex subscriber stations) or due to an operating fault. Furthermore, charging technicalities can render it undesirable to return the signals in question in this manner.

SUMMARY OF THE INVENTION

Accordingly, the object of the invention is to provide a manner in which, in a circuit arrangement of the type generally set forth above, in the event that digital signals which are to be transmitted or have been transmitted from a transmitting subscriber station cannot be deposited, it is possible to avoid heavily loading the signal converter, although the digital signals transmitting from the transmitting subscriber station are not to be lost.

The above object is realized, according to the present invention, in a circuit arrangement of the type generally set forth above in that the data exchange system is additionally connected to at least one separate transmitting-/receiving device which can be operated by the subscriber stations or by the signal converter by means of a special call signal and/or a special dialed number in the event that the subscriber stations or the signal converter are currently unable to deposit digital signals to subscriber stations appointed to receive the same. Further, that in response to such an operation of the transmitting/receiving device, the latter is supplied with the digital signals which cannot currently be deposited together with items of additional information which enable a connection establishment to the subscriber station appointed to receive the digital signals. In addition, it is provided that subsequently the transmitting-/receiving device is able to transmit the digital signals which it has received, together with the items of additional information, to the subscriber station which is to receive such signals.

The invention involves the advantage that, with a relatively low circuit expense, unnecessary blockage of the signal converter can be avoided in the event that digital signals which are either to be supplied to the signal converter or which are already intermediately stored in the signal converter cannot be deposited with the called subscriber. The signals to be supplied to the signal converter are signals to be transmitted from a telex subscriber station or from a teletex subscriber station. The signals intermediately stored in the signal converter are either signals supplied from a telex subscriber station (telex signals) or so-called acknowledgement signals which are to be supplied to a teletex subscriber station. These acknowledgement signals indicate either successful deposition (positive acknowledgement signals) of digital signals previously received from the teletex subscriber station in a telex subscriber station, or the impossibility of depositing such signals (negative acknowledgement signals). In the last-mentioned case, only the negative acknowledgement signals is emitted to the teletex subscriber station, which can then reattempt to transmit signals.

The use of at least two special transmitting/receiving devices assigned to a collective terminal results, in a simple manner, in a particularly high breakdown resistance of the circuit arrangement constructed in accordance with the invention, and on the other hand, when a plurality of signal converters are provided, it is possible to avoid associated blockages in the event that digital signals from the signal converters cannot be simultaneously deposited. Furthermore, the use of the aforementioned special call signal and/or the special dialed number advantageously ensures that the transmitting-/receiving device is retained only for the desired purpose of use, and therefore is not involved in other processes. The transmitting/receiving device can preferably comprise a teletex machine being operated as an automatic transmitting/receiving device as is available as a model T4200 machine from Siemens Corporation, Iselin, N.J.

Preferably, the transmitting/receiving device is operated only after the undertaking of a given number of unsuccessful attempts to deposit digital signals in the called subscriber station. This results in the advantage that the transmitting/receiving device is not operated in the case of short disturbances in the subscriber stations which are to receive digital signals, but only when it can be concluded, with some degree of probability, that the desired subscriber station in question is inaccessible for the time being.

BRIEF DESCRIPTION OF THE DRAWING

Other objects, features and advantages of the invention, its organization, construction and operation will be best understood from the following detailed description, taken in conjunction with the accompanying drawing, on which there is a single block diagram figure illustrating a preferred embodiment of the invention.

DESCRIPTION OF THE PREFERRED EMBODIMENTS

Referring to the drawing, a portion of a known electronic data exchange systemm EDS is illustrated which, in fact, represents a teleprinter and data exchange system (cf. "Nachrichtenlechnische Zeitschrift", Vol. 22, 1969, pp. 444-463 and the Siemens publication "Siemens System EDS", System Description, Siemens Corp., Iselin, N.J., 1977). This data exchange system EDS has been represented merely by connection circuits SAGAx, SAGA1–SAGAn which belong to a first group of connection circuits, connection circuits SAGDx, SAGD1–SAGDn and SAGDo which belong to a second group of connection circuits, and input/output code converters EACW and EACD which belong to the individual groups of connection circuits, a transmission flow control unit UEAS connected to the converters, a storage unit SE and a program control unit PE. The connection circuits which are connected to the input/output code converter EACW serve to process digital signals in terms of polarity changes. The connection circuits which are connected to the other input/output code converter EACD serve to process bit groups which are also referred to as envelopes and each of which comprises a number of bits, for example 6+2 or 8+2 bits. Of these bits, six and eight bits respectively serve as data bits, whereas the other two bits represent the status bit and the synchronizing bit.

As to the connection circuits indicated on the drawing, certain ones of the connection circuits serve to process polarity changes are connected to teleprinters, which are here referred to as telex subscriber stations, and which transmit and receive digital signals having a first data transmission rate and a first data format. These telex subscriber stations can operate with data transmission rate of 50 Bd and employ the international telegraph alphabet No. 2, therefore, with a start-stop data format. The drawing represents only one such telex subscriber station Tx which is connected to the connection circuit SAGAx. A multiple symbol entered on the connection line in question indicates that further telex subscriber stations can also be connected to this connection line.

Certain others of the connection circuits which process digital signals in the form of bit groups or envelopes are connected to transmitting/receiving devices which are designated as teletex subscriber stations and which transmit and receive digital signals in serial fashion in the form of bit groups or envelopes. The drawing, again, illustrates but a single teletex subscriber station Ttx which is connected to the connection circuit SAGDx. Again, a multiple symbol on the connection line in question indicates that further teletex subscriber stations can be connected to this connection circuit. The teletex subscriber stations, which may also be referred to as office teleprinter stations, operate with a bit repetition rate of 2400 bit/s. The data signals which occur at this bit repetition rate are transmitted as synchronous data signals, i.e. without a start signal or a stop signal. It should be noted that the number of characters which can be processed by teletex subscriber stations is greater than that which can be processed by telex stations. This relates, in particular, to capital letters and to a few special symbols.

The data exchange system EDS represented on the drawing is connected to a number of signal converters TTU1–TTUn. Here, the signal converter TTU1 is connected both to the connection circuit SAGA1 and to the connection circuit SAGD1. The signal converter TTUn is connected both to the connection circuit SAGAn and to the connection circuit SAGn. The construction and mode of operation of the signal converters has already been described in association with the known circuit arrangement referred to in the Description of the Prior Art and therefore does not need to be discussed in detail herein. It should be sufficient to point out that each of the signal converters is designed so as to be capable of converting the data signals with which it is supplied so as to enable the digital signals to be processed by the desired receiving subscriber station. This means that every signal converter is able to convert telex signals transmitted from a telex station into digital signals which may be processed by a teletex subscriber station, and is able to convert digital signal transmitted from a teletex subscriber station into telex signals which can then be processed by a telex subscriber station.

As already mentioned above, the input/output code converter EACD is connected to the connection circuit SAGDo inter alia. In the present example, this connection circuit SAGDo is connected to two special teletex transmitting/receiving devices Ttxo1, Ttxo2 which are assigned to one collective terminal. These two teletex transmitting/receiving devices are capable to receiving digital signals which have been emitted either from a teletex subscriber station, such as the teletex subscriber station Ttx, or from one of the signal converters TTU1–TTUn.

In order that the special teletex transmitting/receiving devices Ttxo1, Ttxo2 may be supplied with digital signals, these devices must first be set in operation. This is effected by a special call signal and/or a special dialed number. The special call signal or the special dial number—which in the following will be referred to merely as a special call signal—is emitted only when the digital signals to be emitted from the teletelex subscriber station in question or the signal converter in question cannot be deposited in the desired receiving subscriber station because the latter cannot currently be reached for some reason or other. These digital signals consist of data signals or information signals or acknowledgement signals, as already explained above. Here, it is preferable to proceed in such a manner that the aforementioned special call signal is not released until a predetermined number of consecutive attempts to deposit the digital signals have failed. Therefore, the special call signal in question will be available to the teletex subscriber stations and to the signal converters. Since the transmission of digital signals from and to these devices takes place via the data exchange system EDS, preferably the special call signal is made available by the data exchange system to the devices in question when the data exchange system has unsuccessfully attempted to deposit digital signals. Moreover, it is also possible to make available a special call signal to the teletelex subscriber stations. In this case, it will be necessary to connect at least one special transmitting/receiving device to one of the connection circuits SAGA1–SAGAn, SAGAx.

The aforementioned special call signal serves to establish a connection either from a teletelex subscriber station or from a signal converter to the collective terminal which comprises the two teletex transmitting-/receiving devices Ttxo1, Ttxo2. Only one of these devices will participate in a connection. When such a connection has been established, the signals transmitted from the teletex subscriber station or the signal converter are received and intermediately stored in the special teletex transmitting/receiving device Ttxo1 or Ttxo2. Together with these digital signals which cannot currently be deposited in the desired subscriber station, the teletex transmitting/receiving device is also supplied with items of additional information which facilitate the establishment of a connection to the subscriber station which is to be supplied with the digital signals. Under the simplest circumstances, these items of additional information will consists of subscriber number information relating to the desired subscriber station.

Therefore, the above-described measures ensure that the signal converters TTU1–TTUn are not blocked by lengthy intermediate storage of the digital signals which cannot currently be deposited in the desired subscriber station. In fact, the aforementioned digital signals are either initially not supplied at all to the signal converters—and in fact here in the case that the teletex subscriber station Ttx wishes to transmit digital signals to the telex subscriber station Tx which is not currently accessible—or else the digital signals which are to be deposited from the signal converters in the desired currently-inaccessible subscriber stations are output from the signal converters and stored, in readiness for further transmission, in the teletex transmitting/receiving devices assigned to the collective terminal. Although in this case the teletex transmitting/receiving devices of the collective terminal are temporarily blocked from further access, this is in no way disturbing as a permanent seizure of the signal converters. Furthermore, it is also possible to proceed in such a manner that having received the digital signals with which they are supplied, the teletex transmitting/receiving devices are immediately ready to receive further digital signals which are to be transmitted between various other subscriber stations in the course of other connections.

From the relevant teletex transmitting/receiving device Ttxo1, Ttxo2, the digital signals previously received by the latter are forwarded to the relevant subscriber stations designated by the aforementioned items of additional information. For this purpose, the teletex transmitting/receiving device carries out corresponding connection attempts. Should it prove that the desired subscriber station cannot be reached at all, the digital signals in question are, at the least, retained in the teletex transmitting/receiving device in question which can be considered as one of the centrally-arranged devices.

Finally, it should be noted that the data exchange systems corresponding to the data exchange system represented on the drawing can be connected to one another by transmission lines. In this case, it is readily possible that the collective terminals which represent the above-considered collective terminal and which are provided in the various data exchange systems may be reached by different special call signals or dialed numbers.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement of the type in which a data exchange system is connected to both telex and teletex subscriber stations and includes termination circuits for selectively establishing connections therebetween, and at least one signal converter connected to the system via respective termination circuits and operable to convert the digital signals emitted by a telex subscriber station into digital signals which may be processed by a teletex subscriber station and to convert digital signals emitted by a teletex subscriber station into digital signals which may be processed by a telex subscriber station, the improvement in combination therewith comprising:

at least one teletex transmitting/receiving device connected to an individual termination circuit; special call signal generating means operable to produce a special call signal when a subscriber station is not accessible; and means responsive to a special call signal to cause connection of the teletex transmitting/receiving device for receiving and storing the digital signals transmitted from the accessible subscriber station along with additional items of information identifying the inaccessible subscriber station, and, in response to an inaccessible subscriber station becoming accessible, to interconnect the teletex transmitting receiving device to the previously inaccessible subscriber station in response to the additional items of information for retransmission of the digital signals thereto.

2. The improved circuit arrangement of claim 1, and further comprising:

a plurality of said teletex transmitting/receiving devices connected to said individual termination device which serves as a collective terminal therefor; and means for attempting interconnection of the calling and called subscriber stations a predetermined number of times before connection of a teletex transmitting/receiving device for receiving the digital signals and the additional items of information.

* * * * *